United States Patent

[11] 3,579,874

| [72] | Inventors | Thomas B. Smith<br>672 Jefferson St., Ste. Genevieve, Mo. 63670;<br>Raymond H. Swassing, Jr., 35 Northwood Apts., Storrs, Conn. 06268 |
|---|---|---|
| [21] | Appl. No. | 793,681 |
| [22] | Filed | Jan. 24, 1969 |
| [45] | Patented | May 25, 1971 |

[54] EDUCATIONAL DEVICE FOR TRAINING IN MATHEMATICS
3 Claims, 12 Drawing Figs.

[52] U.S. Cl. .................................................. 35/32, 235/114
[51] Int. Cl. ............................................... G09b 19/02, G06c 27/00
[50] Field of Search ........................................... 35/31, 31.2, 32; 235/74, 114, 135

[56] References Cited
UNITED STATES PATENTS

| 274,424 | 3/1883 | Webb ........................ | 235/74 |
| 477,416 | 6/1892 | Hilliard ..................... | 235/74 |
| 3,030,016 | 4/1962 | Rudduck .................... | 235/114 |

Primary Examiner—Wm. H. Grieb
Attorney—Paul M. Denk

ABSTRACT: An educational device for training in mathematics embodied in a housing having a series of disc structures rotatably mounted therein, each structure including a rotatable axially aligned disc having a forward facing disclosing a sequence of numerical values, usually mathematical numbers contained in select bases other than only defined in the decimal system; the various disc structures cooperate to provide for rearrangement in sequence of the numerical values of the base system under investigation by incorporating catch means for effecting a degree of limited rotation of one disc upon rotation of the adjacent disc.

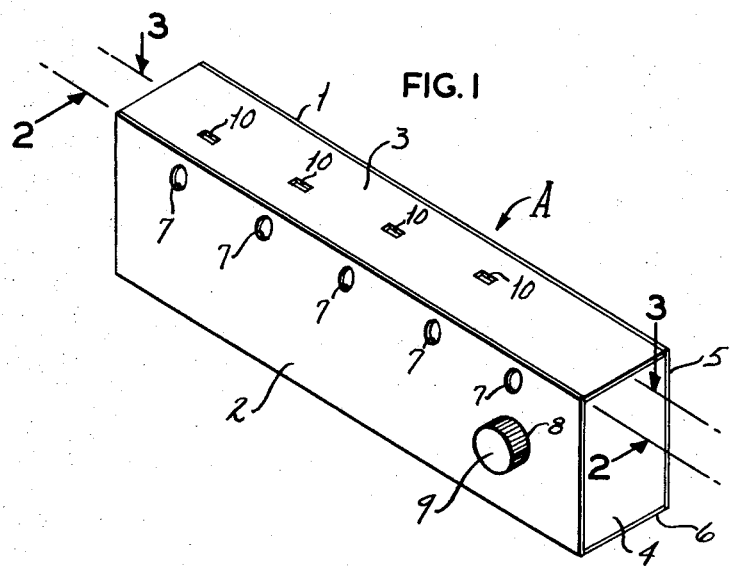
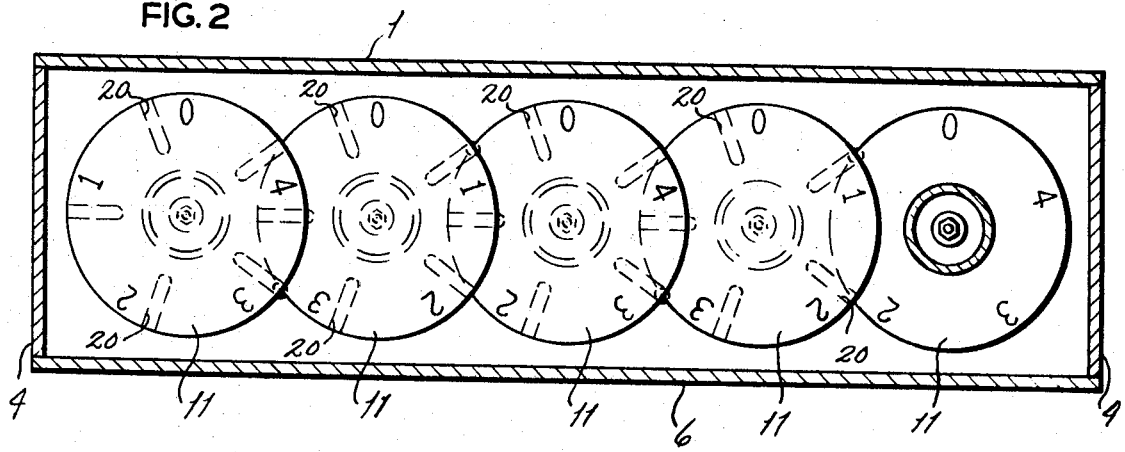
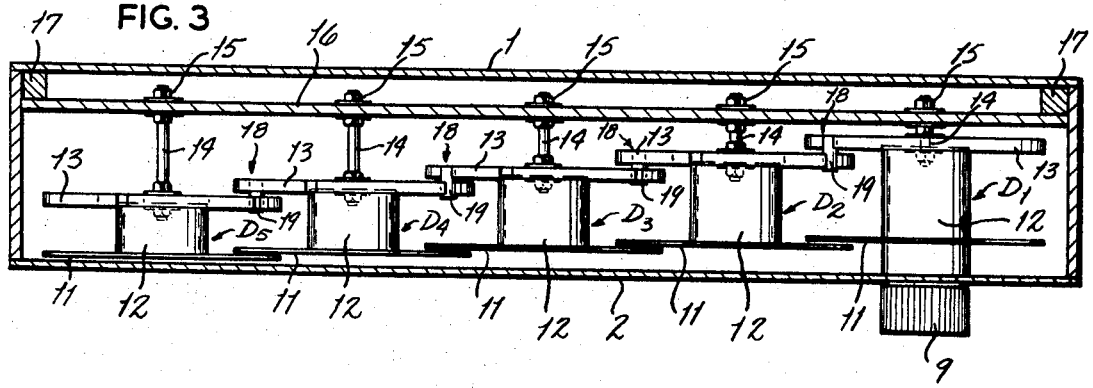

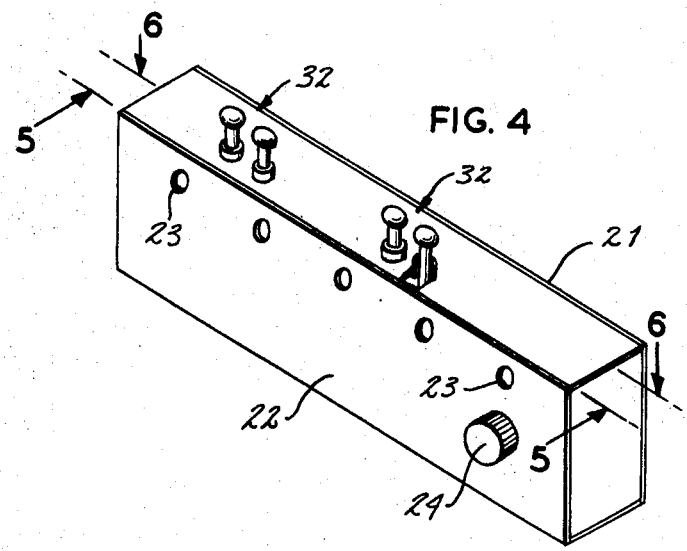
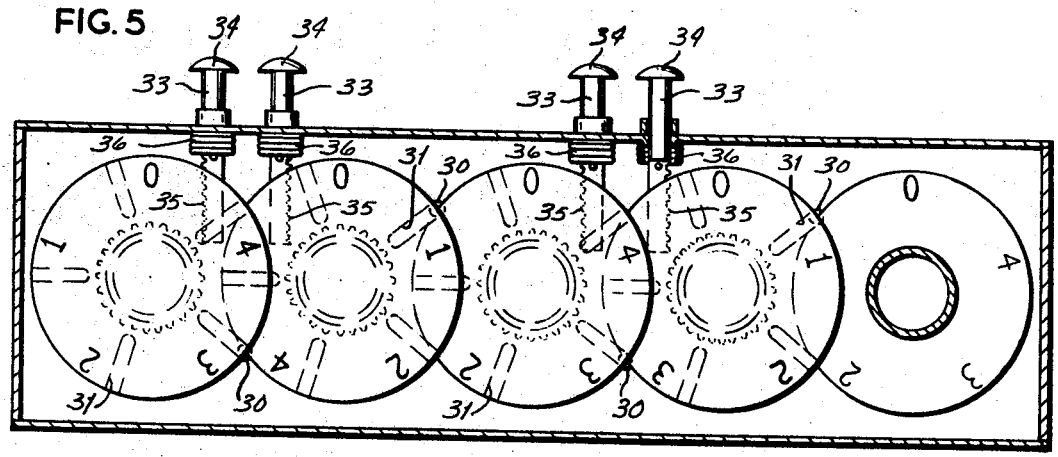
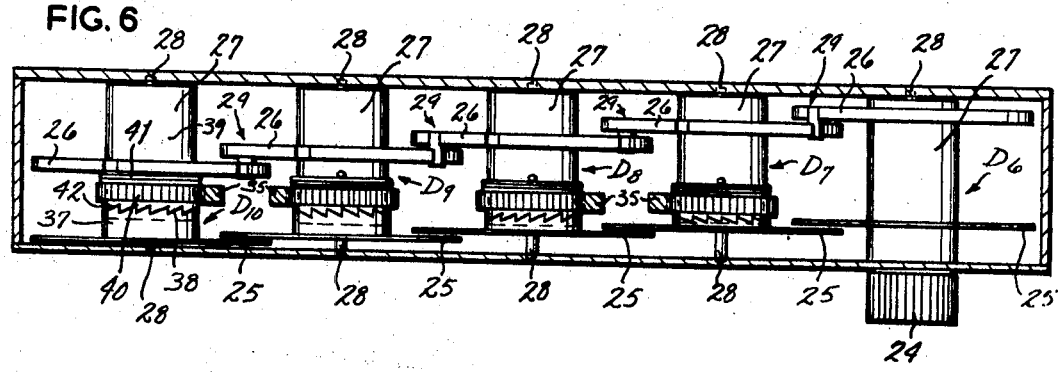

EDUCATIONAL DEVICE FOR TRAINING IN MATHEMATICS

BACKGROUND OF THE INVENTION

This invention relates in general to an apparatus for assisting in the instructing of the relationship between mathematical values, and more particularly, relates to an educational device for aiding the instructor in training the student to comprehend the meaning of numbers in the various base systems, additional of those customarily used in the decimal system.

Various educational aids in the capacity of counter devices have been available for assisting in the training of the student to understand the relationship between numbers, particularly numbers when subjected to mathematical calculations such as addition, subtraction, multiplication or division. Most of these devices simply imprinted a sequence of values upon a drum, reel, or the like, and the student himself would manually turn each particular numbered drum in an attempt to acquire numerical values equivalent to the answer that should be acquired from the type of calculation being performed. None of these prior art devices appear to provide a cooperation between the various numbered reels so that the performance of the calculation can be done mechanically, but to the contrary, as just stated, most of the operations were performed simply through manual efforts. Most of the devices heretofore described as educational aids functioned in the decimal system, and had little or no relationship to calculation or employment of numbers in any other base system. Heretofore, the only educational devices constructed to show the relationship between numbers operating in any other base system, than the decimal system, were usually constructed to perform only to the base two, or binary system. Since the binary system is relatively simple to handle with regard to manipulation of its representative numbers between 0 or 1 to indicate the presence of 2 to a particular power, these binary counters worked simply by means of pivoting a numbered member so that it would disclose either the numeral 0 or 1 depending upon which binary number id desired. Such a device could not be employed to reveal the relationship between numbers in any greater base system by the very nature of its construction, since the two sides of the pivoting member were the only surfaces available for revealing the two numbers, 0 and 1, that are needed to compute in the binary system.

It is, therefore, an object of this invention to provide an educational device useful for automatically showing the relationship between numbers and provide for their setting when operating in base systems in excess of the binary.

It is another object of this invention to provide a mathematical training device which incorporates a series of cooperating and base numbered discs which may be rapidly manipulated to achieve any number in the particular base system under investigation.

It is still another object of this invention to provide a semiautomatic educational device which may be quickly reset in preparation for further usage after completion of a mathematical operation.

It is a further object of this invention to provide a flexible educational training device useful for instructing about the relationship between numbers in the various base systems, and wherein said device may be converted from one base to another with little effort.

It is yet a further object of this invention to provide a mathematics training device which is semiautomatic in operation simplifying its use by either the instructor or student.

These and other objects will become more apparent to those skilled in the art upon a review of the summary of the invention, and a detailed description of its preferred embodiment.

SUMMARY OF THE INVENTION

This invention, as heretofore briefly described, attempts to simplify the process of training one to understand the relationship between the numbers of the various base systems. As to which base systems may be incorporated into this particular device, and the magnitude of the numbers to be constructed, depends upon the limitations in the structural relationship and size of the various means employed for exhibiting the particular digits inclusive of the base system. A brief analysis of the numbering sequence of various digits in a base system, above the binary, will be subsequently discussed, after a brief summary of the embodiment and principle of operation of this invention.

This invention comprehends a base number instructional device including a housing having a frontal portion which conveniently displays the various digits of the base numbering system to which the device has been adapted and set. Mounted within the housing, and disposed for cooperative rotation are a series of disc structures, each including a disc proportioned in height with respect to the frontal portion of the housing, and each disc having a series of digits or numbers included thereupon equivalent to the number of digits contained in the particular base system under investigation. An aperture corresponding to each disc is disposed through the frontal portion of the housing and allows for viewing of the particular digit or digits of the base number set into the device. The initial disc containing the lowest digit of the number of the particular base system is provided with a knob means mounted coaxially thereto and extending forward of the frontal portion of the housing whereby the operator may manually turn said disc to initiate setting of the first digit of the desired number in the base system. Since each adjacent disc structure is provided with catch means for cooperating and subjecting the next adjacent disc to a prearranged limited rotation, base members may be formed in increasing gradations within the particular base system. Each adjacent pair of discs cooperate through the agency of this catch means to provide a resetting of the second disc, representative of the next highest power of the base member, at least 1 digit following a complete rotation of the first disc. This relationship will be hereinafter more fully discussed when analyzing the relationship between digits of a number of a particular base system.

The disc structures of this training device, as previously described, includes a front disc which displays its digits, and for convenience of operation of the catch means interposed between adjacent disc structures, a second disc may mount coaxially rearwardly of said front disc to provide for the mechanical coaction of the catch means providing for rotation of the second disc structure after a complete rotation of the first one has been effected. These disc structures are rotatably disposed within the housing of the device, and they may be either permanently secured therein, or for the sake of convenience, they may be removably mounted so that discs displaying other base numbers may be readily inserted for use within the device. After a lesson in a particular base system has been performed through adjustment of the various discs in displaying a particular base number, it is essential to provide means for rapidly resetting the display discs back to zero so that another training session may be immediately commenced without delay. For this reason, a resetting means cooperates with the various structures other than the initial disc, and provides for a quick and automatic rotation of each display disc back to 0 digit. Through usage of a training device as briefly described, an instructor may rapidly train the student as to the formation of numbers in any particular base system, and for that matter, the relationship between various numbers in other base systems.

By referring to FIGS. 7 thru 12 of the drawings, the relationship between the various discs, including their revealed digits encompassed within each respective base system are conveniently set forth. The relationship between the various digits of these base systems shall be analyzed, but the particular features of the construction of the series of discs will be subsequently more fully described during the description of the preferred embodiment. The numbering system disclosed in FIG. 7 upon the series of five adjacent and slightly overlapping discs is to the base 4, wherein any number or numbers developed in this base system utilize the digits 0 through 3 to represent any given number to the base 4. For example, upon a turning of the right-hand side disc of this series of disc, such turning being conducted in a clockwise manner, the digit 1 will eventually appear arranged upright at the top of the disc, and the number represented by this digit in the base 4 system is the numeral $1_4$. In the decimal system, as an example of a conversion of numbers from one base system to another, the numeral 1 to the base 4 represents the digit 1 times the base 4 raised to the 0 power, which obviously results also in the numeral $1_{10}$, in the commonly used base 10 system. Upon further turning of this initial disc, the digits 2 or 3 will eventually appear upright upon the disc, and the presence of these digits also represents the numbers $2_4$ or $3_4$ in the base 4 system, or when converted to the decimal system, these digits must be multiplied times the base 4 raised to the 0 power, which represent, respectively, the numbers $2_{10}$ or $3_{10}$ per se, in the base 10 system. As this initial disc continues to rotate in sequence from the digit 3 back to the digit 0 upon a clockwise turning, the catch means of this disc engages within the catch means of the second or next adjacent disc to effect its limited rotation at least 1 digit, namely, from the digit 0 to the digit 1, effecting the turning of this disc in a counterclockwise direction. Hence, when the first two discs maintain this relationship, and the digit 1 is disclosed upright on the second disc while the digit 0 appears on the first disc, the number revealed is the numeral $10_4$, in the base 4 system. Again, so that one may understand the relationship between numbers in the base 4 and decimal system, this number $10_4$ in the decimal system may be determined by multiplying $1_4$ times 4 raised to the 1st power, plus $0_4$ times 4 raised to the 0 power, with their summation resulting in the number $4_{10}$, in the base 10 or decimal system. Upon a further complete revolution of the first disc, the digit 2 of the second disc will be displayed vertically and represent $20_4$, in the base 4 system. For each additional rotation of the first disc, the second disc will move precisely 1 digit, and as the second disc completes its first turn, or 1 rotation, or more specifically as it moves from the digit 3 back to the digit 0, the third and next adjacent disc will be rotated and display the digit 1 upright, meaning that the number disclosed will be $100_4$, in the base 4 system. For purposes for clarification, the conversion of this number $100_4$ provides the equivalent number $16_{10}$ in the decimal system, calculated by multiplying 1 times 4 raised to the 2nd power. Therefore, it can be readily seen that the five display discs shown in this FIG. 7 can be set to any number in the base 4 system up to the number $33333_4$. This number in the decimal system equals 3 times 4 raised to the 5th power minus 1, or the number $1023_{10}$. This number would be displayed by having each of the five discs shown in this Figure set with the digit 3 vertically, and then by summing each of these digits after multiplying it by 4 raised, respectively, to the powers of 0 through 4.

The other base systems described in FIGS. 8 through 12 are respectively, the bases 6, 7, 8, 10 and the base 12. The display of any number up to, but not including a base number raised to its 5th power, for each of the particular bases heretofore identified, may be accomplished through revolutions of the various discs disclosed in these FIGS. 8 through 12, and provided that this process is performed similar to the manipulation of the discs as previously described in the study of the numbered discs in FIG. 7. For example, if each of the discs in FIG. 10 were arranged to display the digit 5 upright, the number to the base 8 which would be shown and set upon the training device would be $55555_8$. This number in the decimal or base 10 system would be the digit 5 times 8 raised to the 4th power, plus 5 times 8 raised to the 3rd power, etc., until this calculation and summation has been performed down to 8 raised to the 0 power, which number to the decimal system would be $23405_{10}$, or in the base 10 system. As a point of interest, it should be noted that the digits disclosed in the base 12 system in FIG. 12 indicate that said digits are disposed in sequence from 0 through 9, but that the last 2 digits are represented by the digits T and E; this arrangement is required since in dealing with base numbers, mathematically, the digit 10 in the base 12 system would actually represent the number 12 and not the 10th digit. Although the arrangement of the various base numbers as disclosed in these Figures are shown upon a series of five adjacent and cooperating discs, it should be recognized that an infinite number of discs may be placed in adjacency so as to provide for the setting of numbers to these or other particular bases up to a much greater magnitude. The series of five adjacent discs are shown herein as a matter of convenience and practicality.

BRIEF DESCRIPTION OF THE DRAWINGS

In the drawings, FIG. 1 is a perspective view of the mathematics training device of this invention;

FIG. 2 is a frontal transverse sectional view of the training device taken along the line 2-2 of FIG. 1;

FIG. 3 is a top sectional view of the training device taken along the line 3-3 of FIG. 1;

FIG. 4 is a perspective view of a modified mathematics training device of this invention with a fragmentary part of its upper portion being removed to partially reveal the resetting means;

FIG. 5 is a frontal transverse sectional view of the training device taken along the line 5-5 of FIG. 4;

FIG. 6 is a top sectional view of the training device taken along the line 6-6 of FIG. 4;

DESCRIPTION OF THE PREFERRED EMBODIMENT

Figure 7:
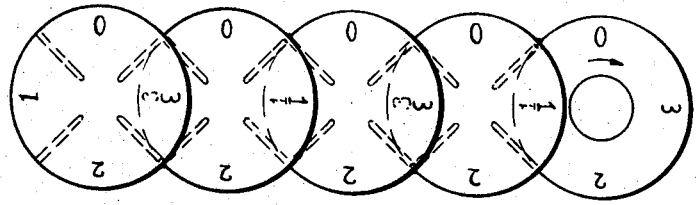
FIG. 7, as previously described, displays a series of five adjacent discs each revealing numerical digits in the base 4 system.

Referring to the drawings for one illustrative embodiment of the educational device for training in mathematics of this invention, FIG. 1 discloses a device A comprising a housing 1 having at least a frontal portion 2 and an upper portion 3 structurally held together by sidewalls, as at 4, back wall 5, and the bottom wall 6. The frontal portion 2 is provided with a series of horizontally aligned apertures 7 through which the various digits of the base number set upon the device may be observed, and an additional aperture 8 allows for the projection therethrough of a turning knob 9 which may be manually manipulated to allow for the select setting of a base number upon the device. Apertures 10 are disposed through the upper portion of the housing, being rearwardly staggered and being provided to allow for a manual resetting of the device back to 0 pending its reuse for a further calculation in the number base system under investigation.

By referring to FIGS. 2 and 3, the internal operations of this embodiment in the educational device may be more readily observed. The housing 1 is herein disclosed having a series of rotatably mounted disc structures $D_1$, $D_2$, $D_3$, $D_4$ and $D_5$. Each disc structure comprises at least a front disc 11 which is maintained horizontally and proximate with the frontal portion 2 of the housing, so that the numerical values provided upon the forward facing of each disc 11 will be readily observable to the viewer looking through the apertures 7 when any particular digit is arranged upright upon the upper portion of each disc when rotated. As previously described, the numerical values set forth on the discs shown in FIG. 2 include digits of numbers to the base 5, but it is to be understood that other numerical base systems may be used, and more or less than the series of five adjacent discs may be employed if desired. As stated, the turning knob 9 extends through the aperture 8 provided through the frontal portion of the housing, and is affixed to the disc 11 of the initial disc structure $D_1$. Each disc structure is composed of the front disc 11, as aforesaid, and is mounted by means of a sleeve 12 to a rear disc 13. Rigidly mounted centrally to each rear disc is a shaft 14, of varying lengths, and each shaft at its back end, as at 15, is stably mounted for rotation through the support 16, and support spanning the entire distance from side to side of the housing, and being secured thereto by connecting with the corner posts 17. It should be noted that although the disc structures are rotatably mounted, their sole means for support during rotation is acquired through the bearing relationship of the shaft 14 through the support 16. It is conceivable, though, that a similar shaft could be provided coaxially at the front part of each disc structure. Operatively associated between each pair of adjacent disc structures, and more particularly between each pair of adjacent rear discs, is a catch means 18 comprising a member 19 that projects from the frontal portion of each rear disc, and is disposed for periodic engagement within the various radial slots 20 selectively arranged, at equidistant degrees apart, in each of the rear discs 13, excepting only the rear disc provided in the initial disc structure $D_1$. Thus, it should be noted that the rear discs of each of the disc structures $D_2$ through $D_5$ are provided with a series of five slots 20, these slots being arranged approximately 72° apart, so that, for example, as the disc structure $D_1$ is turned clockwise through the manual rotation of its turning knob 9, upon completion of a single rotation, thereby causing its digit 4 to disappear from the aperture 7 pending a reappearance of the digit 0, its projecting member 19 will engage within the proximate radial slot 20 of the disc structure $D_2$, thereby causing a limited rotation of this disc approximately 72°, changing the appearance of its digit shown through the aperture 7 from 0 to 1. As had been previously described, continued multiple rotation of the disc structure $D_1$ will eventually effect rotation of all of the disc structures, allowing for a variety of the combined numerical values of each disc to be displayed through the apertures 7 of the device, and in this particular instance, furnishing numbers in the base 5 system. Although the disc structures of this particular embodiment are revealed as including the rear discs 13 which have cooperating catch means 18 for effecting the timed and sequential rotation of each disc structure, it is just as conceivable that the series of rear discs may not be essential to the structure of this device, but rather, some form of similar catch means could be operatively mounted upon the back facing of each disc 11, to effect this sequential rotation of each disc structure during operation of the training device.

Figure 8:
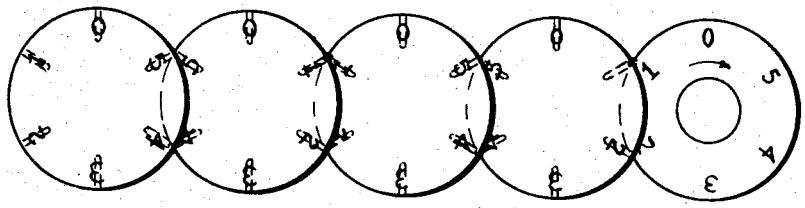
FIG. 8 displays a series of five adjacent discs each revealing numerical digits in the base 6 system.
Figure 9:
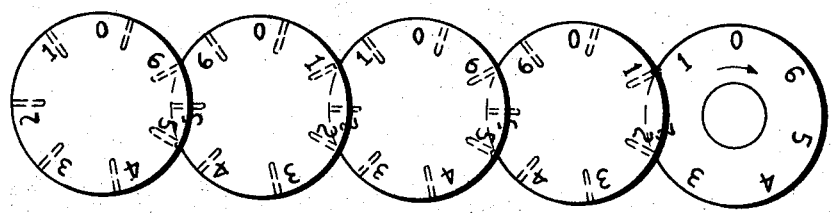
FIG. 9 displays a series of five adjacent discs each revealing numerical digits in the base 7 system.
Figure 10:
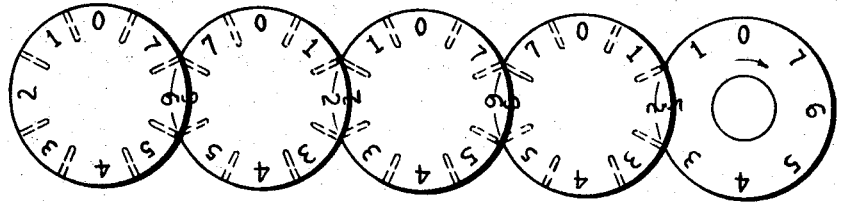
FIG. 10 displays a series of five adjacent discs each revealing numerical digits in the base 8 system.
Figure 11:
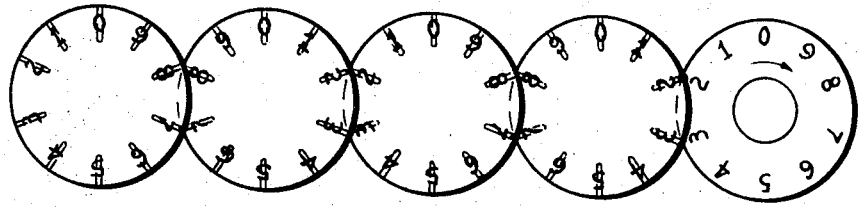
FIG. 11 displays a series of five adjacent discs each revealing numerical digits in the base 10 system.
Figure 12:
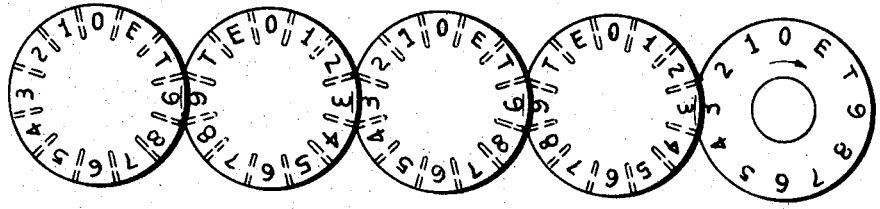
FIG. 12 displays a series of five adjacent discs each revealing digits representing values in the base 12 system.

It may here be noted with regard to FIGS. 7 thru 12, that in addition to the disclosure of a series of five adjacent and slightly overlapping discs displaying the various digits of the numerical values of the select base system, also disclosed are the arrangements of the radial slots in proper positioning with respect to the projecting members and the values, the combination of the projecting members and slots together operating as the catch means for effecting sequential limited movement of each disc structure following a total rotation of the initial disc structure. For example, in FIG. 7, a series of four radial slots are required to achieve proper rotation of each disc when properly displaying the digits in the base 4 system. Each radial slot is herein shown being approximately 90° apart, and the projecting member upon each rear disc is arranged in a manner that allows for its entrance into a select slot at that particular instance which effects a quarter turn of the next adjacent disc at the precise moment to bring the next digit upright. It can be seen that for each arrangement in a base system, there is an equal number of radial slots employed in conjunction with a singular projecting member to act as the catch means for effecting the proper degree of rotation of the next adjacent disc. Through this arrangement, numbers in any base system may be constructed in increasing gradations simply upon a turning of the various numbered discs.

In FIG. 4, a modification in the educational device of this invention is disclosed, and although in outward appearance seems similar to the device described in FIG. 1, this embodiment includes a resetting means for use in rapidly adjusting the interrelated discs back to a 0 digital setting, so that the device may be immediately reused for another base number computation. As herein disclosed, the device is provided with a housing 21 wherein its frontal portion 22 has provided therethrough a series of apertures 23 for viewing of the digits of a base number. A turning knob 24 is provided for effecting a rotation of the initial disc structure $D_6$; see FIG. 6. Each disc structure, $D_6$ thru $D_{10}$, is constructed having a front disc 25 which is structurally associated with a rear disc 26, with the structural association between each disc, as also shown extending rearwardly from the rear disc, being formed in the shape of a sleeve 27. Each disc structure is mounted for rotation by means of the pins 28 connecting with the frontal and back portion of the housing 21, with the exception that no pins are required in the front part of the disc structure $D_6$, since the turning knob retains this disc structure properly centered for rotation. Catch means 29 including its projecting members 30 and radial slots 31 function as previously described to provide for sequential rotation of each structure. It should be understood that the pins 28 may insert within slots (not shown) provided on the interior surfaces of the frontal and rear portions of the housing so that a set of disc structures to one base system may be readily removed and replaced with disc structures of another base system.

The resetting means 32 for this particular modification in the training device comprises a rod 33 having an integral rounded head 34 for facilitating depressing of the rod, with the inserted portion of each rod being formed in the shape of a lateral rack 35. The rods 33 are normally biased out of the housing 31 by means of the tension springs 36. Each sleeve arrangement 27 of the disc structures is formed having a first sleeve portion 37 which is integrally secured axially to the rear facing of the front disc 25, with the back edge of each sleeve having a series of projecting cogs 38 formed integrally thereupon. The second and remaining sleeve portion 39 is disposed integrally through the rear disc 26, and is of a reduced diameter to permit the pinion 40 to be slidingly fitted thereon. This pinion is free to pivot upon the sleeve 39, but is normally held stationary by means of the spring 41. The forward edge of the pinion 40 has formed integrally a series of cogs 42, which cogs intermesh with the cogs 38, to effect simultaneous rotation only during resetting of the entire sleeve arrangement when turned in one direction, but when turned in the opposite direction allows for disengagement of the cogs thereby letting the first sleeve 37 and its connecting front disc 25 remain stationary. This relationship occurs due to the pinion 40 moving slightly rearwardly upon sleeve 39 and against the bias of the spring 41. The pinion 40 has formed around its periphery a series of gear teeth which are disposed for intermeshing with the gears of the rack 35 upon further insertion of the rod 33 into the housing. Depending upon which disc structure is being reset at any given moment, an insertion of a rod 33 causes the rack 35 into engagement with the pinion 40, to achieve a turning of the entire disc structure through a mating of the cogs 38 and 40. Since the cogs intermate upon a turning of the pinion 40 in one direction, a turning of this pinion in this select direction effects a turning of the entire front disc structure, but, a turning of the same pinion in the opposite direction allows the pinion to be urged rearwardly against the bias of the spring 41 inducing the cogs 40 to bypass the cogs 38. Thus, it can be seen that during operation of certain of the resetting means, a depressing of the rod 33 will force the entire disc structure to rotate, and that upon a withdrawal of the same rod the cogs will become disunited. Other of the resetting means operate in the same manner or oppositely. The disc structures of the entire training device may be rapidly reset upon a simple depression of its reset rods 33. It should be noted that the springs 36 are of sufficient strength to provide for a turning of the pinion during the withdrawal action of a particular rod. There is no resetting rod disclosed in combination with the disc structure $D_6$, since its turning knob 24 may be rapidly, manually rotated to achieve a quick resetting.

Numerous variations in the construction of the educational device of this invention, within the scope of the appended claims, will occur to those skilled in the art in light of the foregoing disclosure. For example, as previously described, the catch means may be associated with and function in cooperation with the various front discs of the disc structures, alleviating the need for the rear discs of said structures. The particular design in the embodiment of the device disclosed is merely illustrative.

We claim:

1. An educational device for training in mathematics comprising a housing having at least a frontal and upper portion, a series of disc structures disposed within said housing mounted for rotation about their central axes and being arranged in parallel relationship with respect to each other and said frontal portion, each disc structure comprising a pair of coaxial discs, the front disc of each pair having a sequence of numerical values provided upon its forward facing and disposed for viewing through an aperture provided in the frontal portion of said housing, the front disc of the initial disc structure provided with knob means, said knob means connecting axially centrally of said disc and projecting forwardly of the frontal portion of said housing to facilitate grasping and turning of said initial disc structure, catch means operatively associated with the rear disc of select adjacent pair of disc structures whereby a rotation of the first disc structure effects a partial rotation of the adjacent disc structure, said catch means comprising a member projecting substantially perpendicularly from the surface of the first rear disc and at a location proximate its peripheral edge, the adjacent rear disc having a series of systematically located radial slots extending inwardly from its peripheral edge whereby upon rotation of the first rear disc and disc structure its projecting member engages within one of the slots of the adjacent rear disc causing a degree of rotation of its disc structure, resetting means operatively associated with select disc structures, each select disc structure having a coaxial sleeve connecting to and extending rearwardly from its front disc, the back edge of said sleeve having a series of cogs, a second sleeve mounted to and disposed forwardly of said rear disc and arranged for coaxial rotation normally simultaneously in one direction with said first sleeve and front disc, a pinion gear mounted for sliding rotation around said second sleeve, said pinion gear having a series of cogs projecting from its front edge and disposed for intermeshing with the cogs of the first sleeve, said resetting means comprising a rod extending through the upper portion of the housing, the inserted segment of said rod forming a rack, means normally urging said rod out of said housing, said pinion gear disposed for engagement with the rack whereby longitudinal shifting of said rod and integral rack effects a rotation of the mating pinion and said first sleeve causing a resetting of its connecting numbered disc.

2. An educational device for training in mathematics comprising a housing including frontal upper portions, a series of disc structures disposed within said housing mounted for rotation about their central axes and being arranged in parallel relationship with respect to each other and said frontal portion, each disc structure comprising a pair of structurally connecting coaxial discs, the front disc of each pair having a sequence of numerical values provided upon its forward facing and disposed for viewing through the frontal portion of said housing, catch means operatively associated with the rear disc of each adjacent disc structure, whereby upon the turning of one disc structure engagement with the catch means of the cooperating rear disc of the adjacent disc structure forces a limited turning of its front disc and rearrangement of its numerical values in mathematical sequence, means operatively associated with said housing for effecting resetting of select disc structures and their numbered disc upon completion of a mathematical operation, each resetting means comprising a rod extending through the upper portion of the housing, the inserted segment of said rod forming a rack, each disc structure having operatively associated thereto a pinion gear disposed for engagement with the rack whereby the longitudinal shifting of the rod and integral rack effects a rotation of the mating pinion and disc structure for achieving a resetting of its associated numbered disc.

3. An educational device for training in mathematics comprising a housing including frontal and upper portions, a series of disc structures disposed within said housing mounted for rotation about their central axes and being arranged in parallel relationship with respect to each other and said frontal portion, the discs of said disc structures having a sequence of numerical values provided upon their forward facings and disposed for viewing through the frontal portion of said housing, catch means operatively associated with each of said disc structures which upon a turning of one disc structure produces engagement with the catch means of the adjacent disc structure causing a turning of its disc and rearrangement of its numerical values in mathematical sequence, certain of said disc structures comprising a disc having a coaxial sleeve extending rearwardly therefrom, the back edge of said sleeve having a series of cogs, a second sleeve coaxially mounted normally for rotation simultaneously in one direction with said first sleeve, a pinion gear slidingly mounted around the periphery of said second sleeve, said pinion gear having cogs projecting from its front edge and disposed for intermeshing with the cogs of the first sleeve, a rod extending through the upper portion of the housing, the inserted segment of said rod forming a rack, means normally urging said rod out of said housing, said pinion gear disposed for engagement with said rack whereby a longitudinal shifting of said rod and integral rack effects a rotation of the mating pinion causing a rotation of said first sleeve in one direction and a resetting of its numbered disc.